Dec. 4, 1951     C. A. LAYSTROM ET AL     2,577,661
WALL MIRROR
Filed Jan. 27, 1950
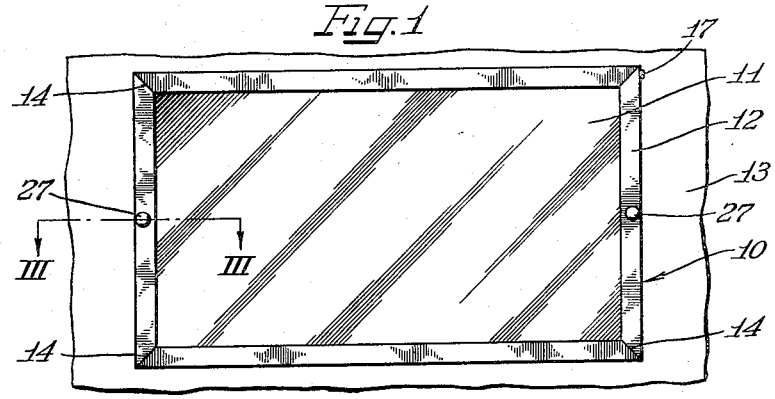
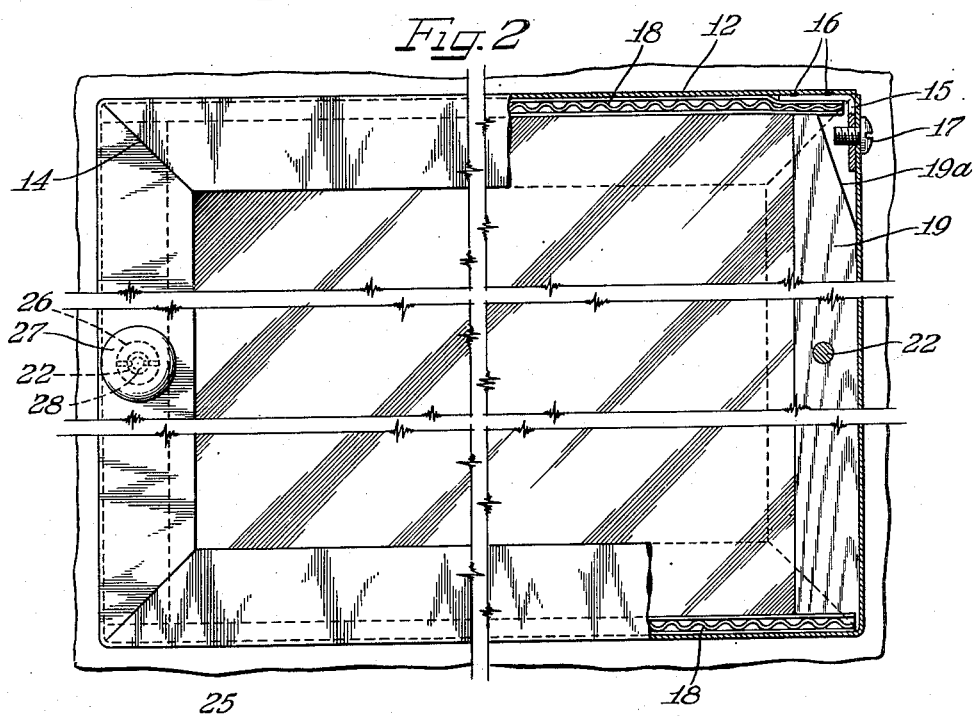
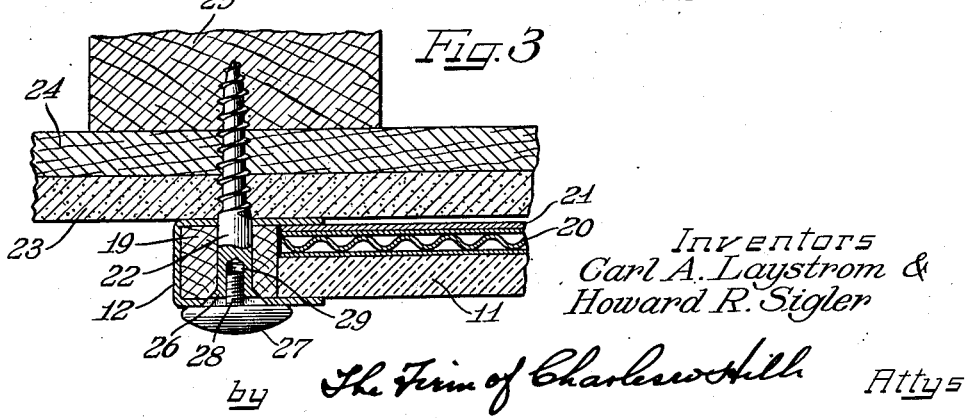
Inventors
Carl A. Laystrom &
Howard R. Sigler
by The Firm of Charles W. Hill    Attys Patented Dec. 4, 1951

2,577,661

UNITED STATES PATENT OFFICE 2,577,661

WALL MIRROR

Carl A. Laystrom, Decatur, and Howard R. Sigler, Argenta, Ill., assignors to Faries Manufacturing Company, Decatur, Ill., a corporation of Illinois Application January 27, 1950, Serial No. 140,914

4 Claims. (Cl. 88—97)

The present invention relates to a wall mirror and more particularly to a wall mirror provided with a novel type of frame and fastening means.

The device of the present invention includes a continuous marginal strip frame conforming in outline to that of the mirror or other frangible member and overlying the marginal portions thereof. The mirror is secured within the frame by means of a pair of opposed marginal load-bearing filler strips and intermediate non-load-bearing filler strips. The load-bearing filler strips are enclosed within the frame and are utilized to secure the mirror to a supporting surface as to a wall or the like, with the intermediate filler strips, likewise enclosed within the frame, preventing unwarranted movement of the mirror therein.

The mirror assembly is preferably attached to a supporting surface by means of a plurality of screws extending through the load-bearing filler strips and the frame and provided with decorative rosettes or buttons which conceal the exposed screw heads.

It is, therefore, an important object of the present invention to provide an improved frame for a mirror or the like frangible member which includes both load-bearing and non-load-bearing filler strips for preventing unwarranted movement of the member within the frame.

Another important object of the present invention is to provide an improved wall mirror including a continuous marginal frame, load-bearing filler strips for securing the mirror and the frame to a supporting surface, and additional non-load-bearing filler strips for preventing unwarranted movement of the mirror within its frame.

Still another important object of the present invention is to provide an improved wall mirror including a marginal frame, filler strips securing the mirror within the frame against relative movement therein, and fastening means for securing the frame to a supporting surface, including decorative rosettes constituting the only exposed portions of the fastening means.

Other and further important objects of this invention will become apparent from the disclosures in the specification and the accompanying drawings.

On the drawings:

Figure 1 is a front elevational view of a mirror of the present invention;

Figure 2 is a greatly enlarged, broken view similar to that of Figure 1, with parts broken away and shown in section; and Figure 3 is a fragmentary sectional view taken along the plane III—III of Figure 1.

As shown on the drawings:

In Figure 1, reference numeral 10 refers generally to a wall mirror of the present invention including a conventional glass mirror 11 disposed within a marginal frame 12 for attachment to a supporting surface, such as wall 13.

As best shown in Figure 2, the frame 12 takes the form of a continuous strip of structural material, such as metal, of U-shaped cross-sectional configuration. The metal strip conforms in outline configuration to that of the mirror 11, which may be rectangular as illustrated, the corners of the strip being beveled, as at 14.

The extreme edges of the strip 12 are secured together by suitable means, as by an angle iron 15 having one leg thereof spot welded to one extremity of the strip 12, as at 16, and the other leg secured to the adjacent extremity of the strip 12, as by the screw 17 received by the corresponding leg of the angle iron 15.

To aid in confining the mirror 11 within the frame 12, a plurality of marginal filler strips are provided. These filler strips include non-load-bearing strips 18 extending along opposed parallel edges of the mirror 11 and of such thickness as to fill the space between the longitudinal edges of the mirror and the adjacent reaches of the frame 12. The non-load-bearing strips 18 are formed of suitable material, such as corrugated paper board, which is resilient under stress due to its corrugated construction to yieldably support the mirror within the frame. The strips 18 thus serve to cushion the longitudinal mirror edges against shock or stress exerted on the corresponding mirror edges.

Those edge portions of the mirror extending between the parallel edges supported by the strips 18 are held against movement within the frame 12 by means of load-bearing filler strips 19 formed of suitable material, such as wood. The strips 19 are generally rectangular in outline and are of such width as to extend from opposed transverse edges of the mirror 11 to the corresponding portions of the frame 12. Also, as illustrated in Figure 3, the strips 19 are of such thickness as to fill the frame 12, as are the strips 18. That edge of the strip 19 directly underlying the angle iron 15 is recessed, as at 19a, to accommodate the screw 17 without fouling the screw threads.

Also, as illustrated in Figure 3, the mirror 11 is provided with a yieldable backing, such as a corrugated paper board sheet 20 of substantially the same size as the mirror, while a decorative backing sheet 21 formed of suitable material, such as cardboard, is also confined within the frame 12.

The frame 12 is secured to a supporting surface, such as the surface 13, by means of wood screws 22 extending through registering apertures formed in transversely opposing portions of the frame 12 and the wood strips 19 confined therebetween. On securing the mirror to a conventional wall surface, the wood screws 22 may extend through the wall plaster 23 and the lath 24 into a stud 25. In order to conceal the unsightly slotted head 26 of the screw 22, a decorative rosette or button 27 is secured to the screw head 26. The button 27 is provided with a threaded shank 28 which extends into a threaded recess 29 formed in the head 26 to secure the rosette to the screw.

The advantages residing in the present invention will be evident to those skilled in the art. First, the mirror is secured within a continuous marginal strip frame having its terminal edges secured and braced by concealed means at the exact point of juncture. The fastening means at the point of juncture are not interfered with by the means retaining the mirror within the frame.

Secondly, the mirror is journaled within the frame by means of opposed load-bearing filler strips and intermediate opposed non-load-bearing filler strips which are resiliently deformable to absorb any possible movement of the relatively heavy mirror within its frame.

Third, the major load of the mirror is carried by the frame reinforced by the load-bearing strips, no matter in what position the mirror is secured to the supporting surface.

Fourth, the fastening screws or other fastening means are concealed from view in the assembled mirror by means of decorative rosettes which are retained directly by the securing means.

It will be understood that modifications and variations may be effected without departing from the scope of the novel concepts of the present invention.

We claim as our invention:

1. A wall mirror or the like which comprises a one-piece wrap around channel strip, means securing the ends of the strip in juxtaposed position to embrace the periphery of a mirror with the peripheral margin of the mirror seated in the channel, resilient cushion strips in opposite portions of the channel cushioning opposite edges of the mirror in snug engagement with the mirror and channel strip, load carrying strips filling opposite portions of the channel at the ends of the mirror in snug engagement with the channel strip and mirror, and fasteners extending through the legs of the filled channel strip portions and through the load carrying strips for mounting the assembly on a wall or the like.

2. A frame comprising a one-piece channel member adapted to be fitted around a peripheral marginal edge portion of a mirror or the like, means for securing the opposite ends of the strip in juxtaposed position, resilient strips in opposite portions of the channel for cushioning opposite edges of the mirror, said resilient strips extending in the channel beyond the ends of the mirror, load carrying strips filling the channel portions at the ends of the mirror in snug engagement with the projecting portions of the resilient strips, fasteners extending through the side legs of the filled channel portions and through the load carrying strips therein for mounting the assembly on a wall or the like, and resilient backing means covering the back face of the mirror between the load carrying strips and having the peripheral margin thereof seated in the channel.

3. A frame assembly comprising a one-piece channel strip adapted to be fitted around four sides of a mirror or the like with the marginal peripheral edge of the mirror projecting into the channel, means for securing the ends of the strip in adjacent mating position, resilient strips in two opposite sides of the channel abutting and cushioning two opposite edges of the mirror and extending beyond the ends of the mirror into the other two sides of the channel, load carrying strips in said other two sides of the channel between said extending ends of the resilient strips in snug seated relation therewith and with the channel, and fasteners extending through the load carrying strips and the side legs of the channel for mounting the assembly on a wall or the like.

4. A wall mirror or the like which comprises a one-piece wrap-around strip of the U-shaped cross section adapted to receive the peripheral marginal edge portion of a mirror or the like in the channel thereof; said strip having mating end portions, a bracket secured to one end portion of the strip in the channel thereof and having a leg portion projecting into a channel at the other end portion of the strip, a fastener extending through the bight portion of said other end of the strip into said leg for holding the ends of the strip in juxtaposed relation, opposed resilient strips in the channel cushioning opposed edges of the mirror or the like, opposed rigid load carrying strips in the channel abutting other opposed edges of the mirror or the like, fasteners extending through the legs of the strip and through said load carrying strips for mounting the assembly on a wall or the like, and the portion of said load carrying strip adjacent the first mentioned fastener being relieved for receiving said first mentioned fastener.

CARL A. LAYSTROM.
HOWARD R. SIGLER.

REFERENCES CITED

The following references are of record in the file of this patent:

UNITED STATES PATENTS

| Number | Name | Date |
|---|---|---|
| 572,253 | Frank | Dec. 1, 1896 |
| 1,812,403 | Hammer | June 30, 1931 |
| 1,813,162 | Hoegger | July 7, 1931 |
| 1,815,940 | Zoerner | July 28, 1931 |
| 2,114,617 | Verhagen | Apr. 19, 1938 |